United States Patent
Ma et al.

(10) Patent No.: US 12,499,149 B2
(45) Date of Patent: Dec. 16, 2025

(54) INFORMATION DISPLAY METHOD AND APPARATUS, COMPUTER DEVICE AND STORAGE MEDIUM

(71) Applicant: Beijing Bytedance Network Technology Co., Ltd., Beijing (CN)

(72) Inventors: Huarong Ma, Beijing (CN); Yanli Wang, Beijing (CN); Ning Hou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/565,331

(22) PCT Filed: Aug. 17, 2022

(86) PCT No.: PCT/CN2022/112923
§ 371 (c)(1),
(2) Date: Nov. 29, 2023

(87) PCT Pub. No.: WO2023/045631
PCT Pub. Date: Mar. 30, 2023

(65) Prior Publication Data
US 2024/0311418 A1 Sep. 19, 2024

(30) Foreign Application Priority Data
Sep. 24, 2021 (CN) .......................... 202111122703.8

(51) Int. Cl.
*G06F 16/438* (2019.01)
(52) U.S. Cl.
CPC ................. *G06F 16/438* (2019.01)

(58) Field of Classification Search
CPC ..................................... G06F 16/438
See application file for complete search history.

(56) References Cited

U.S. PATENT DOCUMENTS 12,147,657 B2 * 11/2024 Wilson .................. G06T 11/206
2011/0213655 A1 9/2011 Henkin et al.
(Continued)

FOREIGN PATENT DOCUMENTS

| CN | 106844641 A | 6/2017 |
| CN | 105786869 B | 5/2020 |

(Continued)

OTHER PUBLICATIONS

Office Action for Chinese Patent Application No. 202111122703.8, mailed Jun. 1, 2024, 13 pages.

*Primary Examiner* — Baoquoc N To
(74) *Attorney, Agent, or Firm* — Astute IP Law Group

(57) ABSTRACT

An information display method and apparatus, a computer device and a storage medium are provided. The method includes: receiving search information, the search information corresponding to a structured requirement for a search result; acquiring a plurality of target multimedia contents matching the search information, the target multimedia content including an image content and/or a video content; determining a display mode of the target multimedia content in a search result aggregation card according to an event attribute feature corresponding to the search information, the event attribute feature referring to a structured feature of an event matching the search information; and displaying the search result aggregation card corresponding to the search information according to the display mode determined.

19 Claims, 8 Drawing Sheets

(56) References Cited

U.S. PATENT DOCUMENTS

| | | | |
|---|---|---|---|
| 2020/0020182 A1* | 1/2020 | Florentino | G07C 9/28 |
| 2020/0356590 A1* | 11/2020 | Clarke | G06F 3/0482 |
| 2021/0227009 A1* | 7/2021 | Carney Landow | H04L 65/612 |
| 2021/0337265 A1* | 10/2021 | Carney Landow | H04N 21/4398 |

FOREIGN PATENT DOCUMENTS

| | | |
|---|---|---|
| CN | 111460257 A | 7/2020 |
| CN | 112069405 A | 12/2020 |
| CN | 112084268 A | 12/2020 |
| CN | 112084405 A | 12/2020 |
| CN | 112464115 A | 3/2021 |
| CN | 113177055 A | 7/2021 |
| CN | 113204690 A | 8/2021 |
| CN | 113254779 A | 8/2021 |
| CN | 113849734 A | 12/2021 |

* cited by examiner

INFORMATION DISPLAY METHOD AND APPARATUS, COMPUTER DEVICE AND STORAGE MEDIUM

CROSS-REFERENCE TO RELATED APPLICATION

This is a national stage application filed under 37 U.S.C. 371 based on International Patent Application No. PCT/CN2022/112923, filed Aug. 17, 2022, which claims the priority of the Chinese patent application No. 202111122703.8, entitled "INFORMATION DISPLAY METHOD AND APPARATUS, COMPUTER DEVICE AND STORAGE MEDIUM", filed with China National Intellectual Property Administration on Sep. 24, 2021, the disclosures of which are incorporated herein by reference in their entireties.

TECHNICAL FIELD

The present disclosure relates to the technical field of information display, in particular to an information display method and apparatus, a computer device and a storage medium.

BACKGROUND

With the rapid development of information technology, an increasing number of users are using the Internet to access information.

When the user inputs search information, a list of search results is fed back to the user based on the user's search information, and brief information of a plurality of media content is displayed in the list of search results, the search result may include a video or an image.

Typically, when displaying the list of search results, the characteristics of the event that match the search results are not taken into consideration. For instance, when the user initiates a search for information related to a certain event, the user may be more interested in quickly learn more about a certain aspect of the event. If the brief information of each media content related to the event is only displayed sequentially in the form of the above search result list, the user needs to browse through each multimedia content to find the desired search result which is not an efficient way to meet the user's search needs.

SUMMARY

Embodiments of the present disclosure provide at least an information display method and apparatus, a computer device and a storage medium.

In a first aspect, embodiments of the present disclosure provide an information display method, which includes:
receiving search information, the search information corresponding to a structured requirement for a search result;
acquiring a plurality of target multimedia contents matching the search information, the target multimedia content including an image content and/or a video content;
determining a display mode of the target multimedia content in a search result aggregation card according to an event attribute feature corresponding to the search information, the event attribute feature referring to a structured feature of an event matching the search information; and
displaying the search result aggregation card corresponding to the search information according to the display mode determined.

In an optional embodiment, determining a display mode of the target multimedia content in a search result aggregation card according to an event attribute feature corresponding to the search information includes:
in case that the event corresponding to the search information has a temporal context feature, determining that the display mode is to display according to a timeline; and
displaying the search result aggregation card corresponding to the search information according to the display mode determined includes:
displaying a timeline of the event corresponding to the search information in a first area of the search result aggregation card, a plurality of time nodes being arranged in the timeline, and each time node corresponding to a progressing stage of the event; and
displaying a target multimedia content corresponding to a selected target time node among the plurality of time nodes in a second area of the search result aggregation card.

In an optional embodiment, displaying a target multimedia content corresponding to a selected target time node among the plurality of time nodes in a second area of the search result aggregation card, includes:
in case that the target time node corresponds to a plurality of target multimedia contents, sequentially displaying the plurality of target multimedia contents in response to a scroll operation applied to the second area.

In an optional embodiment, determining a display mode of the target multimedia content in a search result aggregation card according to an event attribute feature corresponding to the search information includes:
in case that the search information has a structured feature suitable for multi-image or multi-video presentation, determining that the display mode is multi-picture display; and
displaying a search result aggregation card corresponding to the search information according to the display mode determined includes:
displaying dimension information of a plurality of dimensions and a target multimedia content corresponding to each dimension in a first area of the search result aggregation card, the plurality of dimensions being determined based on content attributes of the multi-image or the multi-video; and
displaying a target multimedia content corresponding to a selected target dimension among the plurality of dimensions in a second area of the search result aggregation card,
a target multimedia content corresponding to each dimension displayed in the first area having a same size in a preset direction as the target multimedia content corresponding to the selected target dimension displayed in the second area.

In an optional embodiment, displaying dimension information of a plurality of dimensions and a target multimedia content corresponding to each dimension in a first area of the search result aggregation card, includes:
in the first area, displaying the dimension information of the plurality of dimensions and a target image in each dimension, the target image being used for representing an image set or a video set; and displaying a target multimedia content corresponding to a selected target dimension among the plurality of dimensions in a second area of the search result aggregation card, includes:
in the second area, according to an arrangement order of each image or video in the target dimension, sequentially playing each image in the image set or each video in the video set.

In an optional embodiment, the method further includes:
in case that it is determined that there exists a need for displaying a comment content for the event corresponding to the search information, acquiring a plurality of comment contents corresponding to the plurality of target multimedia contents; and
displaying the comment content in a plurality of floating sub-areas of a third area of the search result aggregation card, each of the floating sub-areas being used for displaying one comment content, a number of the floating sub-areas being less than a preset number threshold, and in case that a number of the plurality of comment contents is greater than the preset number threshold, the floating sub-areas updating the comment content displayed according to a preset frequency.

In an optional embodiment, displaying the comment content in a plurality of floating sub-areas of a third area of the search result aggregation card, includes:
according to a currently played image or video in the second area, displaying a comment content associated with the currently played image or video in the plurality of floating sub-areas of the third area of the search result aggregation card.

In an optional embodiment, the method further includes:
determining a target entity object associated with the plurality of target multimedia contents; and
in a fourth area of the search result aggregation card, displaying encyclopedic introductory information of the target entity object, the encyclopedic introductory information being used for displaying an encyclopedic content corresponding to the target entity object after being triggered.

In a second aspect, embodiments of the present disclosure provide an information display apparatus, which includes:
a receiving module configured to receive search information, the search information corresponding to structured requirements for a search result;
a first acquisition module configured to acquire a plurality of target multimedia contents matching the search information, the target multimedia content including an image content and/or video content;
a first determination module configured to determine a display mode of the target multimedia content in a search result aggregation card according to an event attribute feature corresponding to the search information, the event attribute feature referring to a structured feature of an event matching the search information; and
a first display module configured to display the search result aggregation card corresponding to the search information according to the display mode determined.

In a third aspect, embodiments of the present disclosure provide a computer device, which includes a processor, a memory and a bus. when the computer device runs, the processor communicates with the memory through the bus; and when the machine-readable instructions are executed by the processor, the steps in the first aspect described above, or in any of the possible embodiments of the first aspect are executed.

In a fourth aspect, embodiments of the present disclosure further provide a computer-readable storage medium, a computer program is stored on the computer-readable storage medium, and when the computer program is executed by a processor, the steps in the first aspect described above, or in any of the possible embodiments of the first aspect are executed.

An information display method and apparatus, a computer device and a storage medium provided by embodiments of the present disclosure, when displaying a search result for search information corresponding to a structured requirement for the search result, a search result aggregation card in a corresponding display mode can be presented based on an event attribute feature (structured feature of an event matching the search information) corresponding to the search information, allowing the user to clearly view a plurality of structured target multimedia contents, thus improving the efficiency of information browsing.

In addition, by displaying the comment content associated with the currently played image or video, the embodiments of the present disclosure not only enable the user to obtain more information related to the target multimedia content based on the comment content and improve the efficiency of obtaining information, but also increase the interaction with the user.

In order to make the above objects, features and advantages of the present disclosure more evident and comprehensible, the following detailed description is provided, illustrating exemplary embodiments and accompanied by the drawings.

BRIEF DESCRIPTION OF THE DRAWINGS

To more clearly illustrate the embodiments of the present disclosure, the drawings required to be used for the embodiments are briefly described in the following. The drawings herein are incorporated into and form a part of the specification, illustrate embodiments consistent with the present disclosure, and are used in conjunction with the specification to explain the principles of the present disclosure. It should be understood that are only some embodiments of the present disclosure, and therefore should not be regarded as limiting the scope. For those skilled in the art, other drawings can be obtained based on these drawings without any inventive work.

DETAILED DESCRIPTION

Figure 1:
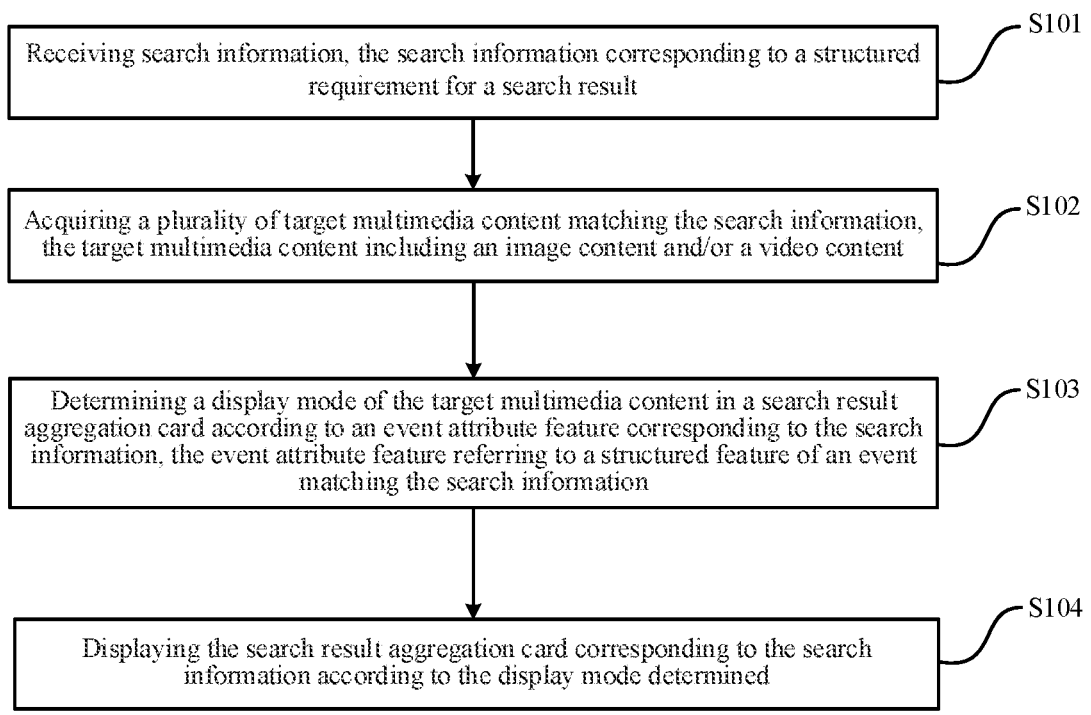
FIG. 1 is a flowchart of an information display method provided by an embodiment of the present disclosure.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all of the embodiments of the present disclosure. The components in the embodiments of the present disclosure generally described and illustrated in the drawings herein may be arranged and designed in various different configurations. Therefore, the following detailed description of the embodiments of the present disclosure provided in the accompanying drawings is not intended to limit the scope of the claimed disclosure, but merely represents selected embodiments of the present disclosure. Based on the described embodiments herein, those skilled in the art can obtain other embodiment(s), without any inventive work, which should be within the scope of the present disclosure.

When the user inputs search information, a list of search results is fed back to the user based on the user's search information, and brief information of a plurality of media contents is displayed in the list of search results, the search result may include a video or an image Typically, when displaying the list of search results, the characteristics of the event that match the search results are not taken into consideration. For instance, when the user initiates a search for information related to a certain event, the user may be more interested in quickly learn more about a certain aspect of the event. If the brief information of each media content related to the event is only displayed sequentially in the form of the above search result list, the user needs to browse through each multimedia content to find the desired search result which is not an efficient way to meet the user's search needs.

In view of this, the embodiments of the present disclosure provide an information display method and apparatus, a computer device and a storage medium. The method includes: receiving search information, the search information corresponding to a structured requirement for a search result; acquiring a plurality of target multimedia contents matching the search information, the target multimedia content including an image content and/or a video content; determining a display mode of the target multimedia content in a search result aggregation card according to an event attribute feature corresponding to the search information, the event attribute feature referring to a structured feature of an event matching the search information; and displaying a search result aggregation card corresponding to the search information according to the display mode determined. According to the embodiments of the present disclosure, when displaying a search result for search information corresponding to a structured requirement for the search result, a search result aggregation card in a corresponding display mode can be presented based on an event attribute feature (structured feature of an event matching the search information) corresponding to the search information, allowing the user to clearly view a plurality of structured target multimedia contents, thus improving the efficiency of information browsing.

The defects identified in the above solutions and the proposed solutions are the results of the inventors' practice and careful study. Therefore, the discovery process of the above problems and the solutions proposed in the present disclosure should all be considered as the contributions made by the inventors in the process of the present disclosure.

It should be noted that similar reference numerals and letters indicate similar items in the following accompanying drawings, so once an item is defined in one accompanying drawing, it will not be further defined and explained in subsequent accompanying drawings.

To facilitate the understanding of the embodiments, firstly, an information display method disclosed in an embodiment of the present disclosure is introduced in detail. The executive subject of the information display method provided in the embodiment of the present disclosure is generally a computer device with certain computing power.

Next, the information display method provided by the embodiment of the present disclosure will be explained by taking a terminal device as the executive subject.

Referring to FIG. 1 which is a flowchart of an information display method provided by an embodiment of the present disclosure, the method includes S101-S104.

S101, receiving search information, the search information corresponding to a structured requirement for a search result.

In the embodiment of the present disclosure, the structured requirement for the search result means the need to display the search result in a structured manner. The search information may be search information corresponding to a target event, or search information corresponding to search result that is suitable for multi-image/multi-video presentation. The target event and the search result suitable for multi-image/multi-video presentation may be a thematic event.

In case that the search information is search information corresponding to a target event, the corresponding search result can be displayed according to the structured feature of the target event, for example, the search result can be displayed based on the relevance or temporal context of each event node in the target event. In case that the search information is search information corresponding to the search result that is suitable for multi-image/multi-video presentation, the corresponding search result can be displayed in a multi-picture form. See the following description for details.

S102, acquiring a plurality of target multimedia contents matching the search information, the target multimedia content including an image content and/or a video content.

For the above search information, a plurality of image contents, or a plurality of video contents, or a plurality of image contents and video contents matching the search information can be acquired. The form of the acquired target multimedia content is related to the thematic event corresponding to the search information.

S103, determining a display mode of the target multimedia content in a search result aggregation card according to an event attribute feature corresponding to the search information, the event attribute feature referring to a structured feature of an event matching the search information.

The event attribute feature may be a temporal context feature of the event, a structured feature suitable for multi-image or multi-video presentation, etc. Different event attribute features correspond to different display modes. For example, in the case of the temporal context feature, the target multimedia content can be displayed according to a timeline, and in the case of the structured feature suitable for a multi-image or multi-video presentation, the target multimedia content can be displayed in a multi-picture form. See the following description for details.

S104, displaying the search result aggregation card corresponding to the search information according to the display mode determined.

In the above steps, the structured feature of the event matching the search information may include the temporal context feature and the structured feature suitable for the multi-image or multi-video presentation. The display mode of the target multimedia content in the search result aggregation card may vary depending on different event attribute features. In an embodiment, if the event corresponding to the search information has a temporal context feature, it is determined that the display mode is to display according to a timeline. In another embodiment, if the search information has a structured feature suitable for the multi-image or multi-video presentation, it is determined that the display mode is a multi-picture display.

With respect to the above display mode of displaying according to a timeline, specifically, a timeline of the event corresponding to the search information can be displayed in a first area of the search result aggregation card; a plurality of time nodes are arranged in the timeline, and each time node corresponds to a progressing stage of the event; and in a second area of the search result aggregation card, target multimedia content corresponding to a selected target node among the plurality of time nodes is displayed.

In order to display the various time nodes of the timeline in the first area while displaying the target multimedia content corresponding to the target node in the second area, the first area and the second area can be set in different areas of the search result aggregation card. For example, the first area and the second area can be arranged in a vertically adjacent manner or in a horizontally adjacent manner.

Figure 2:
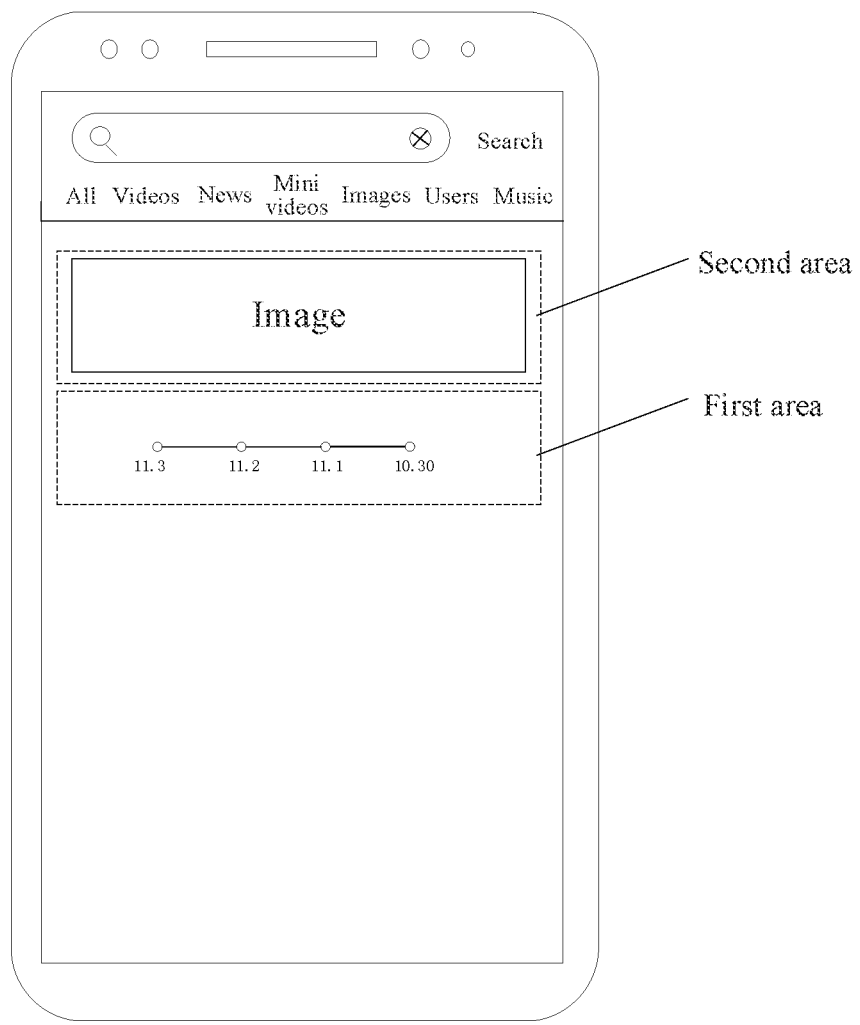
FIG. 2 is an effect schematic diagram of a first search result aggregation card provided by an embodiment of the present disclosure.
Figure 3:
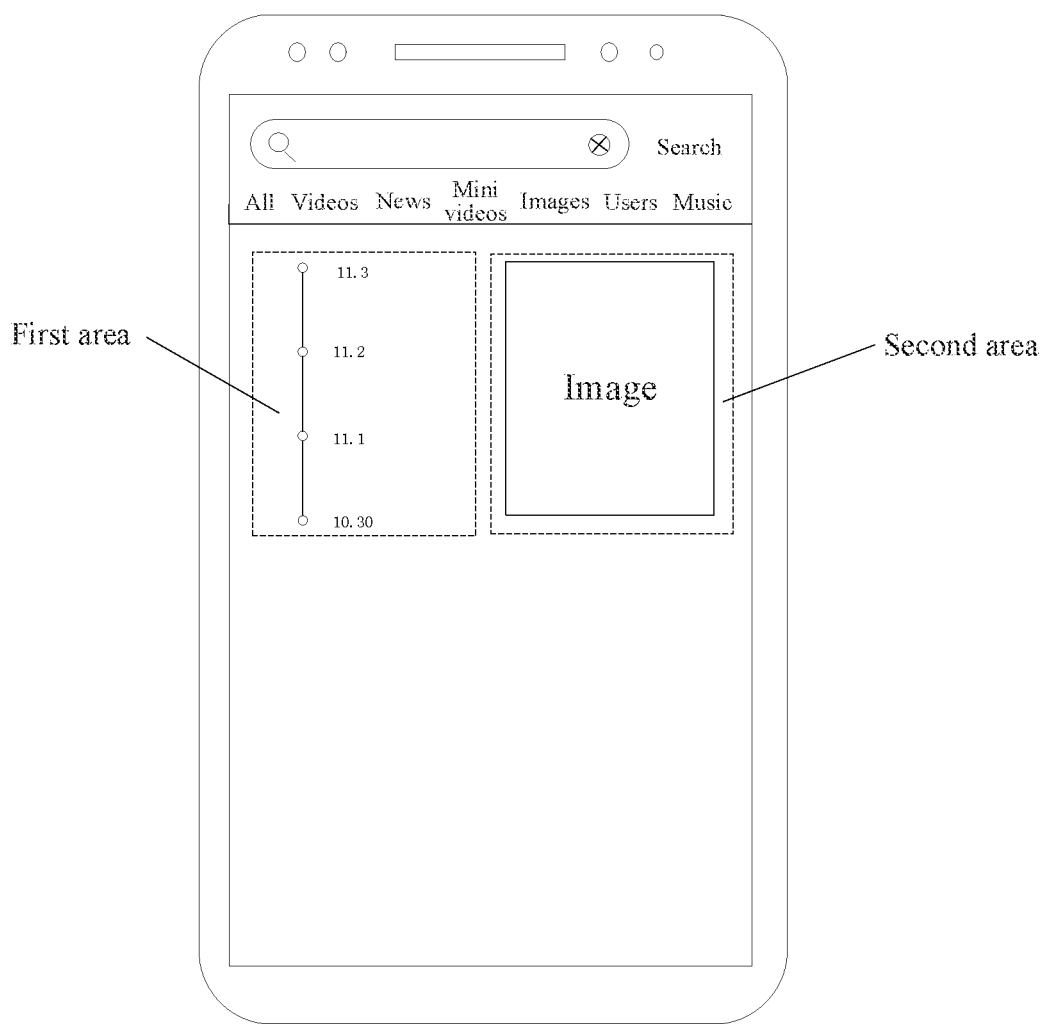
FIG. 3 is an effect schematic diagram of a second search result aggregation card provided by an embodiment of the present disclosure.

The timeline in the first area may be set as a horizontal timeline or a vertical timeline. In case that the timeline is set as a horizontal timeline, the time nodes can be arranged from left to right or from right to left according to the progress of the event, and each time node corresponds to a progressing stage of the event. In this case, the second area and the first area can be arranged in a vertically adjacent manner. In FIG. 2 which is an effect schematic diagram of a first search result aggregation card, the second area and the first area are illustrated to be arranged in a vertically adjacent manner, the second area is arranged immediately above the first area. In case that the timeline is set as a vertical timeline, the time nodes can be arranged from top to bottom or from bottom to top in chronological order. In this case, the second area and the first area can be arranged in a horizontally adjacent manner. In FIG. 3 which is an effect schematic diagram of a second search result aggregation card, the second area and the first area are illustrated to be arranged in a horizontally adjacent manner, the second area is arranged immediately to the right of the first area.

In case that there are only a few time nodes on the timeline, all the time nodes can be displayed. In case that there are many time nodes on the timeline, the time nodes can be partially displayed. As an example, a preset number of the most recent time nodes can be displayed by default. In case that there are many time nodes on the timeline, in an embodiment, in response to a scroll operation applied to the first area, the preset number of time nodes to be displayed can be re-determined according to the scroll direction and scroll distance, and the preset number of re-determined time nodes can be displayed.

In the second area, a target multimedia content corresponding to the preset time nodes on the timeline can be displayed by default. As an example, the target multimedia content corresponding to the most recent time node can be displayed by default. Each time node can correspond to at least one target multimedia content. In an embodiment, in response to a trigger operation on the target node, the target multimedia content corresponding to the selected target node among the plurality of time nodes can be displayed in the second area.

In the second area, the target multimedia content corresponding to each time node can be automatically displayed in turn according to the time sequence of the time nodes on the timeline by default. In an embodiment, if the target time node corresponds to a plurality of target multimedia contents, the plurality of target multimedia contents can be displayed in the second area in turn in response to a scroll operation applied to the second area. Specifically, the target multimedia content of the time node to be displayed can be determined according to the scroll direction and scroll distance, and the target multimedia content of the determined time node can be displayed in turn.

Figure 4:
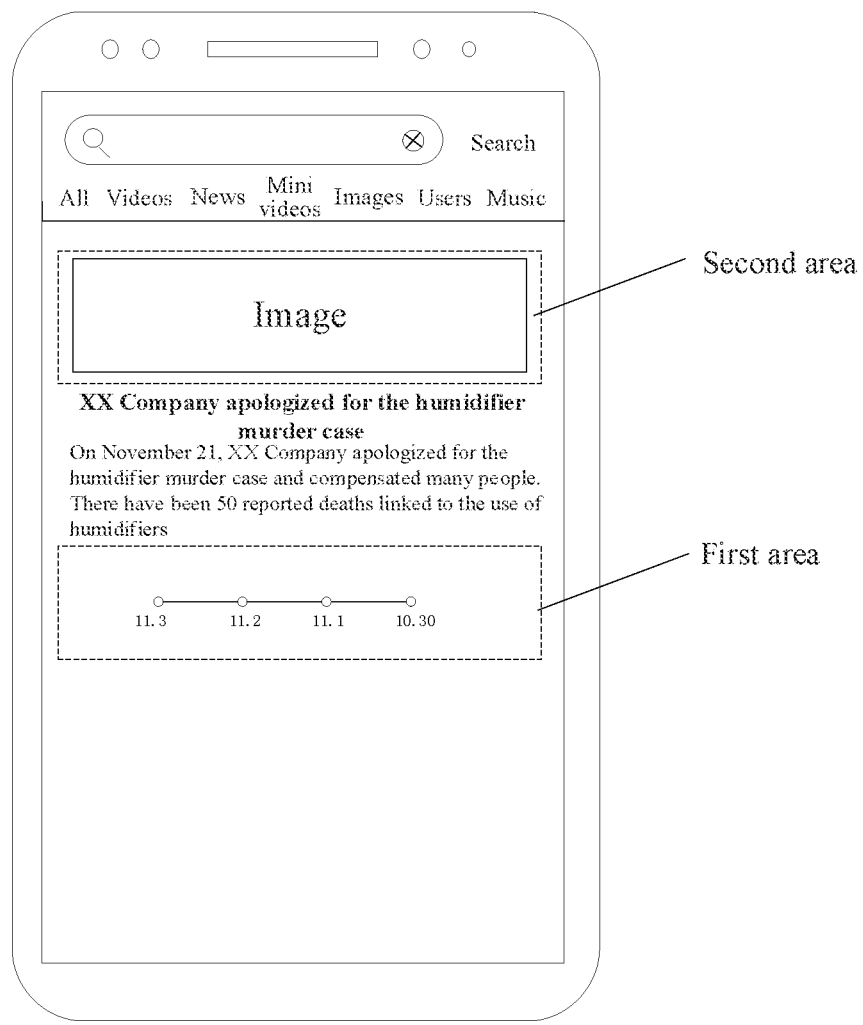
FIG. 4 is an effect schematic diagram of a third search result aggregation card provided by an embodiment of the present disclosure.

In an embodiment, event detail information and/or key information at each time node can also be displayed. The key information may include a summary of the event detail information. To allow the user to quickly access the key information corresponding to the time node, the presentation format of the key information may be different from the presentation format of the event detail information. For example, the font size, color, and other presentation formats of the key information can be different from the event detail information. As illustrated in FIG. 4 which is an effect schematic diagram of a third search result aggregation card, the event detail information at the target node is "On November 21, XX Company apologized for the humidifier murder case and compensated many people. There have been 50 reported deaths linked to the use of humidifiers", and the key information is "XX Company apologized for the humidifier murder case". The event detail information and the key information are displayed below the second area and above the first area, with the key information displayed in bold above the event detail information.

With respect to the above the above display mode of multi-picture display, specifically, in a first area of the search result aggregation card, dimension information of a plurality of dimensions and target multimedia content corresponding to each dimension are displayed, and the plurality of dimensions are determined based on content attributes of the multi-image or the multi-video; in a second area of the search result aggregation card, a target multimedia content corresponding to a selected target dimension among the plurality of dimensions is displayed; and a target multimedia content corresponding to the plurality of dimensions displayed in the first area has the same size in a preset direction as the target multimedia content corresponding to the target dimension displayed in the second area.

Figure 5:
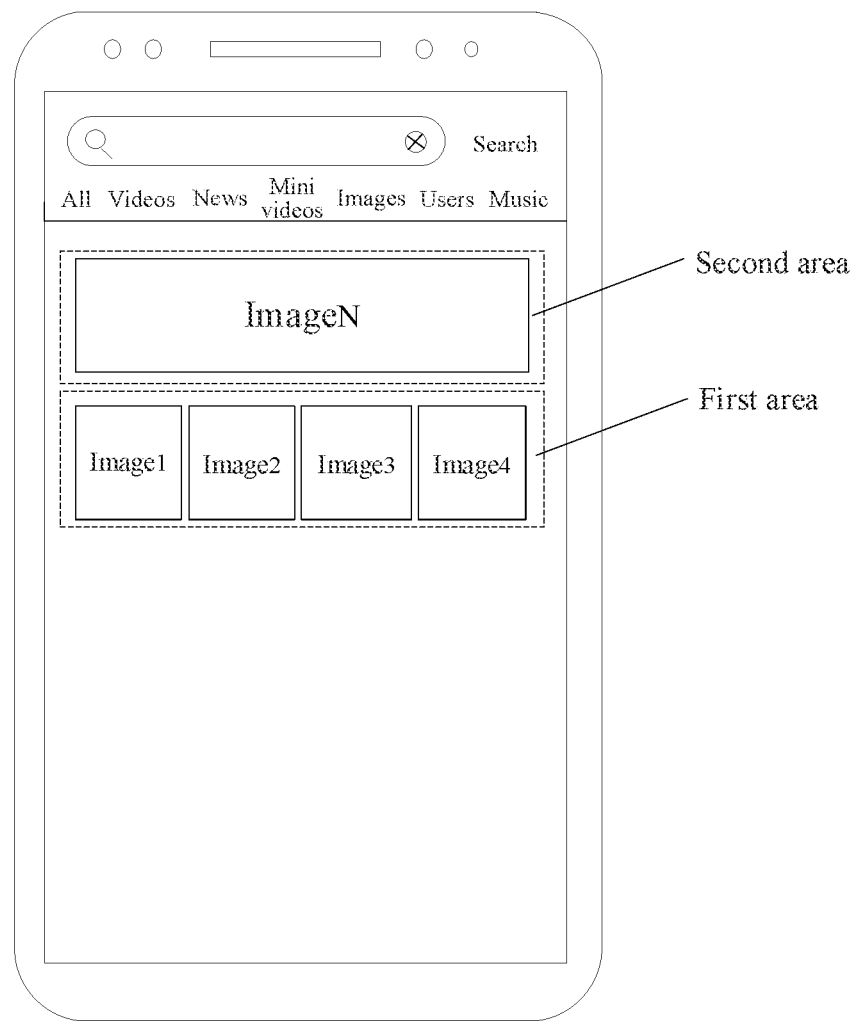
FIG. 5 is an effect schematic diagram of a fourth search result aggregation card provided by an embodiment of the present disclosure.

In order to display the dimension information of the plurality of dimensions and the target multimedia content corresponding to each dimension in the first area, while displaying the target multimedia content corresponding to the selected target dimension among the plurality of dimensions in the second area, as described above, the first area and the second area can be set in different areas of the search result aggregation card. As an example, the first area and the second area can be arranged in a vertically adjacent manner or in a horizontally adjacent manner. In order to make the arrangement of the first area and the second area neater, the length of the first area can be the same as the length of the second area, and in an embodiment, the target multimedia content corresponding to the plurality of dimensions displayed in the first area has the same size in a preset direction as the target multimedia content corresponding to the target dimension displayed in the second area. As illustrated in FIG. 5 which is an effect schematic diagram of a fourth search result aggregation card, the second area and the first area are illustrated to be arranged in a vertically adjacent manner, the second area is arranged immediately above the first area, i.e., the sum of the lengths of multiple images in the first area is the same as the length of the image in the second area (not considering the gap between adjacent images).

The content attributes of the multi-image or the multi-video may include trailers, behind-the-scenes footage, breaking news, promotional events, plot analysis, posters, etc. The dimensions corresponding to the target multimedia content displayed in the second area may be the same or different. The dimension information may include the number of images or videos, the content attribute name, the video duration, the video playback status, and other information.

The target multimedia content corresponding to the plurality of dimensions may be arranged in the first area from left to right. The arrangement position of the target multimedia content corresponding to each dimension in the second area may be random.

In case that there are only a few dimensions corresponding to the multi-image or the multi-video, the first area can display the dimension information of all the dimensions and the target multimedia content corresponding to each dimension. In case that there are many dimensions corresponding to the multi-image or the multi-video, the first area can display the dimension information of some dimensions and the target multimedia content corresponding to each dimension. As an example, the dimension information of preset dimensions and the target multimedia content corresponding to each dimension can be displayed by default. In case that there are many dimensions corresponding to the multi-image or the multi-video, in an embodiment, in response to a scroll operation applied to the first area, the dimension information of the preset dimensions to be displayed and the target multimedia content corresponding to each dimension can be re-determined according to the scroll direction and scroll distance, and the dimension information of the re-determined preset dimensions and the target multimedia content corresponding to each dimension can be displayed.

The second area can display the target multimedia content corresponding to the preset dimensions by default. As an example, the target multimedia content corresponding to the dimension arranged on the leftmost side can be displayed by default. In an embodiment, the target multimedia content corresponding to the selected target dimension among the plurality of dimensions can be displayed in the second area in response to a trigger operation on the target dimension.

In the second area, the target multimedia content corresponding to each dimension can be automatically displayed in turn according to the arrangement order of the target multimedia content corresponding to the plurality of dimensions by default. In an embodiment, it is also possible to sequentially display the target multimedia content corresponding to a plurality of dimensions in the second area in response to a scroll operation applied to the second area. Specifically, the target multimedia content corresponding to the dimensions to be displayed can be determined according to the scroll direction and scroll distance, and the target multimedia content corresponding to the determined dimensions can be displayed in turn.

Each dimension can correspond to at least one image or video. When each dimension corresponds to multiple images or videos, in an embodiment, the dimension information of multiple dimensions and target images in each dimension can be displayed in the first area, the target image is used for representing an image set or a video set. In the second area, each image in the image set or each video in the video set can be played in sequence according to the arrangement order of each image or each video in the target dimension. The video can be automatically played or played when the user triggers a play button.

To enhance interactivity with the user, a comment content for the target multimedia content can be displayed in a third area of the search result aggregation card. In an embodiment, a plurality of comment contents corresponding to a plurality of target multimedia contents can be acquired in case that it is determined that there exists a need for displaying a comment content for the event corresponding to the search information (for example, in case that the event corresponding to the search information is a hot event). In a plurality of floating sub-areas of the third area of the search result aggregation card, the comment content is displayed, each floating sub-area is used for displaying one comment content, the number of the floating sub-areas is less than a preset number threshold, and in case that the number of comments is greater than the preset number threshold, the floating sub-areas update the displayed comment content according to a preset frequency.

Figure 6:
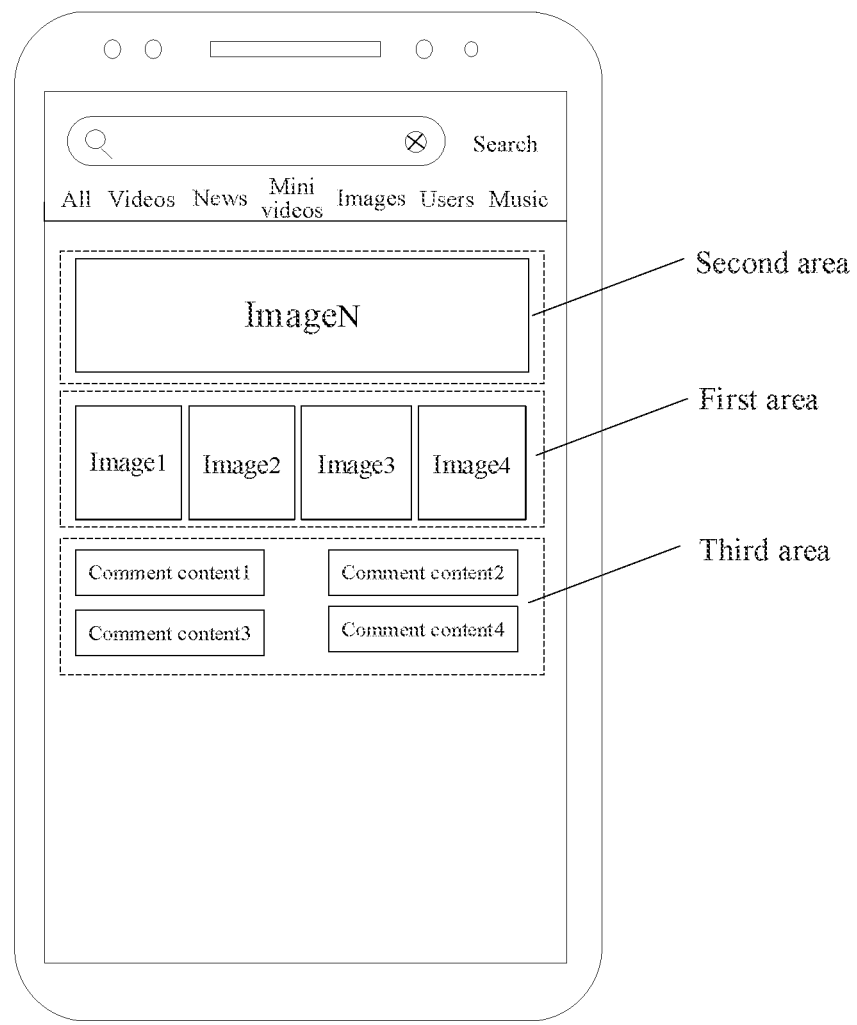
FIG. 6 is an effect schematic diagram of a fifth search result aggregation card provided by an embodiment of the present disclosure.

The third area can be set below the first area or the second area. As illustrated in FIG. 6 which is an effect schematic diagram of a fifth search result aggregation card, the third area is located below the first area, and a preset number of floating sub-areas can be displayed in the third area. The floating sub-area can be displayed in the third area in a floating manner. As an example, the floating sub-area can float up and down, float left and right, or scroll. Considering that the size range of the third area is limited, the number threshold of the floating sub-areas can be set here. Each floating sub-area can display one comment content. In case that the number of comments is less than or equal to the preset number threshold, all the floating sub-areas can be displayed in the third area. In case that the number of comments is greater than the preset number threshold, the displayed comment content can be updated according to a preset frequency, for example, every 5 minutes. The preset frequency can be determined according to the number of comments added within a unit time or set as a fixed frequency.

In an embodiment, the comment content can be associated with the currently played image or video, that is, according to the currently played image or video in the second area, the comment content associated with the currently played image or video is displayed in multiple floating sub-areas in the third area of the search result aggregation card. In each floating sub-area, other users' attitude information towards the comment content can also be displayed. Specifically, the attitude information may include supportive attitude or opposing attitude.

In addition, a target entity object associated with the plurality of target multimedia contents can also be determined; and in a fourth area of the search result aggregation card, the encyclopedic introductory information of the target entity object is displayed. The encyclopedic introductory information is used for displaying corresponding encyclopedic content of the target entity object after being triggered.

Figure 7:
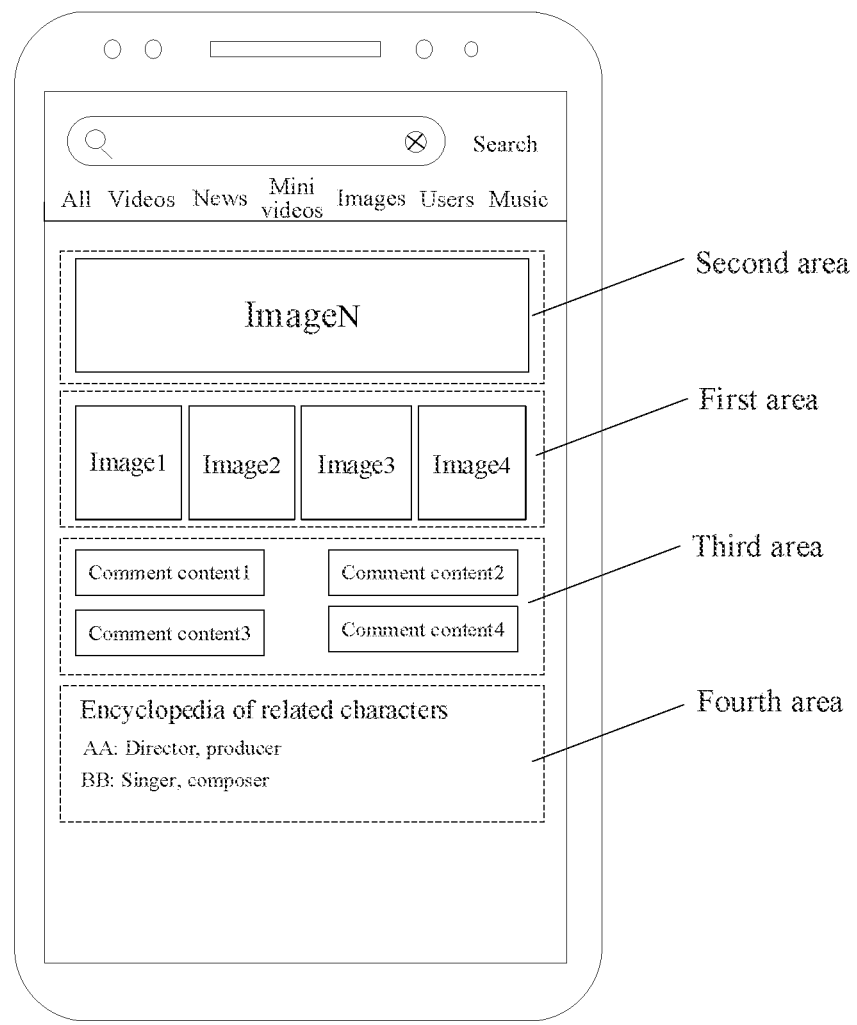
FIG. 7 is an effect schematic diagram of a sixth search result aggregation card provided by an embodiment of the present disclosure.

The target entity object can be the main object described by the target multimedia content, such as a character, a book, a TV series, etc. As illustrated in FIG. 7 which is an effect schematic diagram of a sixth search result aggregation card, the fourth area can be displayed below the third area, and encyclopedic introductory information of a preset number of target entity objects can be displayed in the fourth area. By displaying the encyclopedic introductory information of the target entity object, the search requirement of the user can be better met and the information browsing efficiency can be improved.

It can be understood by those skilled in the art that in the above-mentioned method according to specific embodiments, the order of writing the steps does not necessarily imply a strict execution sequence or impose any limitations on the embodiment process. The specific execution sequence of each step should be determined based on its functionality and possible inherent logic.

Based on the same inventive concept, an embodiment of the present disclosure also provides an information display apparatus corresponding to the information display method. Because the principle of solving problems by the apparatus in the embodiment of the present disclosure is similar to the above-mentioned information display method, the embodiment of the method can be used as a reference for the embodiment of the device, which will not be repeated here.

Figure 8:
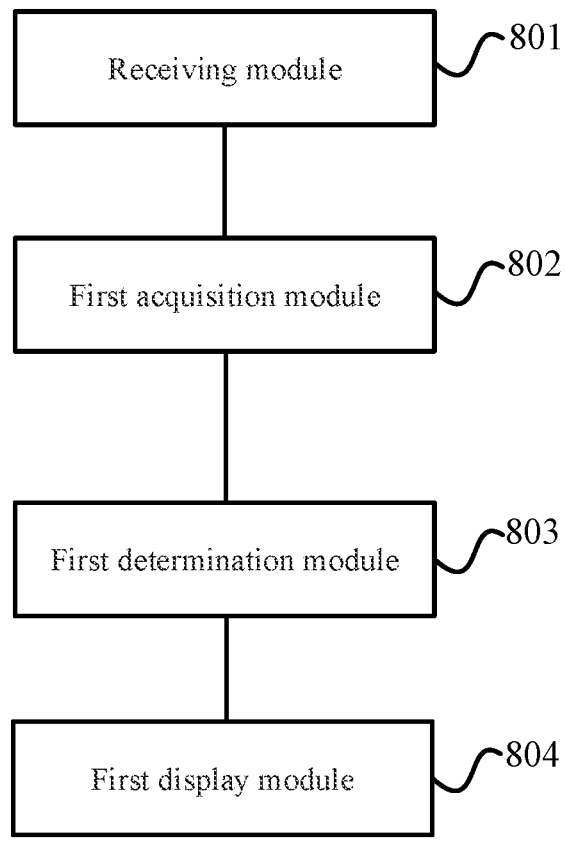
FIG. 8 is a structural schematic diagram of an information display apparatus provided by an embodiment of the present disclosure.

Referring to FIG. 8 which is a structural schematic diagram of an information display apparatus provided by an embodiment of the present disclosure, the apparatus includes a receiving module 801, a first acquisition module 802, a first determination module 803, and a first display module 804;

the receiving module 801 is configured to receive search information, the search information corresponding to structured requirements for a search result;

the first acquisition module 802 is configured to acquire a plurality of target multimedia contents matching the search information, the target multimedia content including an image content and/or a video content;

the first determination module 803 is configured to determine a display mode of the target multimedia content in a search result aggregation card according to an event attribute feature corresponding to the search information, the event attribute feature referring to a structured feature of an event matching the search information; and the first display module 804 is configured to display the search result aggregation card corresponding to the search information according to the display mode determined.

In an optional embodiment, the first determination module 803 is specifically configured to:

in case that the event corresponding to the search information has a temporal context feature, determine that the display mode is to display according to a timeline; and the first display module 804 is specifically configured to:

display a timeline of the event corresponding to the search information in a first area of the search result aggregation card, a plurality of time nodes being arranged in the timeline, and each time node corresponds to a progressing stage of the event; and display a target multimedia content corresponding to a selected target time node among the plurality of time nodes in a second area of the search result aggregation card.

In an optional embodiment, the first determination module 803 is specifically configured to:

in case that the target time node corresponds to a plurality of target multimedia contents, sequentially display the plurality of target multimedia contents in response to a scroll operation applied to the second area.

In an optional embodiment, the first determination module 803 is specifically configured to:

in case that the search information has a structured feature suitable for multi-image or multi-video presentation, determine that the display mode is multi-picture display; and the first display module 804 is specifically configured to:

display dimension information of a plurality of dimensions and a target multimedia content corresponding to each dimension in a first area of the search result aggregation card, the plurality of dimensions being determined based on content attributes of the multi-image or the multi-video; and display a target multimedia content corresponding to a selected target dimension among the plurality of dimensions in a second area of the search result aggregation card, a target multimedia content corresponding to each dimension displayed in the first area having the same size in a preset direction as the target multimedia content corresponding to the selected target dimension displayed in the second area.

In an optional embodiment, the first display module 804 is specifically configured to:

in the first area, display the dimension information of the plurality of dimensions and a target image in each dimension, the target image being used for representing an image set or a video set; and in the second area, according to an arrangement order of each image or video in the target dimension, sequentially play each image in the image set or each video in the video set.

In an optional embodiment, the apparatus further includes:

a second acquisition module configured to, in case that it is determined that there exists a need for displaying a comment content for the event corresponding to the search information, acquire a plurality of comment contents corresponding to the plurality of target multimedia contents; and a second display module configured to, display the comment content in a plurality of floating sub-areas of a third area of the search result aggregation card, each of the floating sub-areas being used for displaying one comment content, the number of the floating sub-areas being less than a preset number threshold, and in case that the number of the plurality of comment contents is greater than the preset number threshold, the floating sub-areas updating the comment content displayed according to a preset frequency.

In an optional embodiment, the second display module is specifically configured to:

according to a currently played image or video in the second area, display a comment content associated with the currently played image or video in the plurality of floating sub-areas of the third area of the search result aggregation card.

In an optional embodiment, the apparatus further includes:

a second determination module configured to determine a target entity object associated with the plurality of target multimedia contents; and a third display module configured to, in a fourth area of the search result aggregation card, display the encyclopedic introductory information of the target entity object, the encyclopedic introductory information being used for displaying encyclopedic content corresponding to the target entity object after being triggered.

For the process flow of each module in the apparatus and the interactive process between modules, please refer to the relevant description in the above method embodiment, which will not be repeated here.

Figure 9:
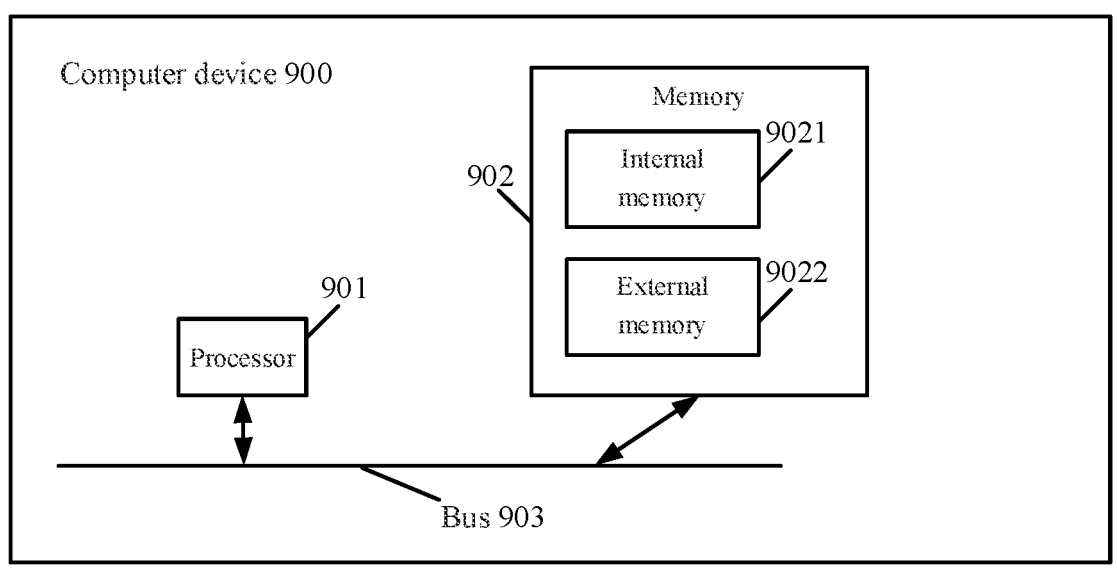
FIG. 9 is a structural schematic diagram of a computer device provided by an embodiment of the present disclosure.

Based on the same technical concept, an embodiment of the present disclosure also provides a computer device. Referring to FIG. 9 which a structural schematic diagram of a computer device 900 provided by an embodiment of the present disclosure, the computer device includes a processor 901, a memory 902, and a bus 903. The memory 902 is used to store execution instructions, including an internal memory 9021 and the external memory 9022. The internal memory 9021, also called internal storage, is used for temporarily storing operation data in the processor 901 and data exchanged with the external memory 9022 such as a hard disk. The processor 901 exchanges data with the external memory 9022 through the internal memory 9021. When the computer device 900 runs, the processor 901 communicates with the memory 902 through the bus 903, so that the processor 901 executes the following instructions:

receiving search information, the search information corresponding to a structured requirement for a search result;

acquiring a plurality of target multimedia contents matching the search information, the target multimedia content including image content and/or a video content;

determining a display mode of the target multimedia content in a search result aggregation card according to an event attribute feature corresponding to the search information, the event attribute feature referring to a structured feature of an event matching the search information; and displaying a search result aggregation card corresponding to the search information according to the display mode determined.

An embodiment of the present disclosure also provides a computer-readable storage medium, on which a computer program is stored, and when the computer program is executed by a processor, the steps of the information display method described in the above method embodiment are executed. The storage medium can be a volatile or nonvolatile computer-readable storage medium.

An embodiment of the present disclosure also provides a computer program product, which carries a program code, and the program code includes instructions that can be used to execute the steps of the information display method described in the above method embodiment. For details, please refer to the above-mentioned method embodiment, which is not repeated here.

The above computer program product can be implemented through a hardware, a software, or their combination. In an alternative embodiment, the computer program product is embodied as a computer storage medium, and in another alternative embodiment, the computer program product is embodied as a software product, such as a Software Development Kit (SDK).

It can be clearly understood by those skilled in the art that for the convenience and conciseness of description, to understand the specific working process of the system and apparatus described above, one can refer to the corresponding process in the aforementioned method embodiment, which will not be repeated here. In several embodiments provided by the present disclosure, it should be understood that the disclosed system, apparatus and method can be realized in other ways. The apparatus embodiment described above is only schematic. For example, the division of the units is only a logical function division, and there may be other division methods in actual embodiment. For another example, multiple units or components may be combined or integrated into another system, or some features may be ignored or not implemented. Furthermore, the displayed or discussed coupling or direct coupling or communication can be indirect coupling or communication through some communication interfaces, apparatuses, or units, which can be electrical, mechanical, or in other forms.

The units described as separate components may or may not be physically separated, and the components displayed as units may or may not be physical units, i.e., may be located in one place or may be distributed over plurality of network units. Some or all of the units can be selected according to actual needs to achieve the purpose of this embodiment.

In addition, all functional units in each embodiment of the present disclosure may be integrated into one processing unit, or exist physically separated, or two or more units may be integrated into one unit.

If the functions are realized in the form of software functional units and sold or used as independent products, they can be stored in a processor-executable nonvolatile computer-readable storage medium. Based on this understanding, the essence of the technical solution of the present disclosure, or the part that contributes to the prior art, or part of this technical solution, can be embodied in the form of a software product, which is stored in a storage medium and includes several instructions to make a computer device (which can be a personal computer, a server, a network device, etc.) execute all or part of the steps of the method described in various embodiments of the present disclosure. The aforementioned storage media include: a USB flash disk, a mobile hard disk, a read-only memory (ROM), a random access memory (RAM), a magnetic disk or optical disk and other media that can store program codes.

Finally, it should be noted that the above-mentioned embodiments are only specific embodiments of present disclosure, which are used to illustrate the technical solution of the present disclosure, but not to limit it. The protection scope of the present disclosure is not limited to these embodiments. Although the present disclosure has been described in detail with reference to the above-mentioned embodiments, it should be understood by those of ordinary skill in the art that any technician familiar with the technical field can still modify or easily think of changes to the technical solution recorded in the above-mentioned embodiments within the technical scope of the present disclosure, or equivalently replace certain technical features described in the aforementioned embodiments. These modifications, changes or substitutions do not make the essence of the corresponding technical solution deviate from the spirit and scope of the technical solution of the embodiments of the present disclosure, and should be included in the protection scope of the present disclosure. Therefore, the scope of protection of the present disclosure should be based on the scope of protection of the claims.

The invention claimed is:

1. An information display method, comprising:
receiving search information, the search information corresponding to a structured requirement for a search result;
acquiring at least one target multimedia content matching the search information, the target multimedia content comprising an image content and/or a video content;
determining a display mode of the target multimedia content in a search result aggregation card according to an event attribute feature corresponding to the search information, wherein the event attribute feature refers to a structured feature of an event matching the search information, and the event attribute feature comprises a temporal context feature of the event or a structured feature suitable for multi-image or multi-video presentation; and
displaying the search result aggregation card corresponding to the search information according to the display mode determined,
wherein in response to the event corresponding to the search information having the temporal context feature, the displaying the search result aggregation card corresponding to the search information according to the display mode determined comprises:
displaying a timeline of the event corresponding to the search information in a first area of the search result aggregation card, a plurality of time nodes being arranged in the timeline, and each time node corresponding to a progressing stage of the event; and
displaying a target multimedia content corresponding to a selected target time node among the plurality of time nodes in a second area of the search result aggregation card.

2. The method according to claim 1, wherein the determining the display mode of the target multimedia content in the search result aggregation card according to the event attribute feature corresponding to the search information comprises:
in response to the event corresponding to the search information having the temporal context feature, determining that the display mode is to display according to the timeline.

3. The method according to claim 2, wherein the displaying the target multimedia content corresponding to the selected target time node among the plurality of time nodes in the second area of the search result aggregation card, comprises:
in response to the target time node corresponding to at least one target multimedia content, sequentially displaying the at least one target multimedia content in response to a scroll operation applied to the second area.

4. The method according to claim 1, wherein the determining the display mode of the target multimedia content in the search result aggregation card according to an event attribute feature corresponding to the search information comprises:
in response to the search information having the structured feature suitable for multi-image or multi-video presentation, determining that the display mode is multi-picture display; and
the displaying a search result aggregation card corresponding to the search information according to the display mode determined comprises:
displaying dimension information of a plurality of dimensions and a target multimedia content corresponding to each dimension in the first area of the search result aggregation card, the plurality of dimensions being determined based on content attributes of the multi-image or the multi-video; and
displaying a target multimedia content corresponding to a selected target dimension among the plurality of dimensions in the second area of the search result aggregation card,
the target multimedia content corresponding to each dimension displayed in the first area having a same size in a preset direction as the target multimedia content corresponding to the selected target dimension displayed in the second area.

5. The method according to claim 4, wherein the displaying dimension information of the plurality of dimensions and the target multimedia content corresponding to each dimension in the first area of the search result aggregation card, comprises:
in the first area, displaying the dimension information of the plurality of dimensions and a target image in each dimension, the target image being used for representing an image set or a video set; and
the displaying a target multimedia content corresponding to a selected target dimension among the plurality of dimensions in the second area of the search result aggregation card, comprises:
in the second area, according to an arrangement order of each image or video in the target dimension, sequentially playing each image in the image set or each video in the video set.

6. The method according to claim 5, further comprising:
in response to determining that there exists a need for displaying a comment content for the event corresponding to the search information, acquiring at least one comment content corresponding to the at least one target multimedia content; and
displaying the comment content in a plurality of floating sub-areas of a third area of the search result aggregation card, wherein each of the floating sub-areas is used for displaying one comment content, a number of the floating sub-areas is less than a preset number threshold, and in response to a number of the at least one comment content being greater than the preset number threshold, the floating sub-areas updates the comment content displayed according to a preset frequency.

7. The method according to claim 6, wherein the displaying the comment content in the plurality of floating sub-areas of the third area of the search result aggregation card, comprises:
according to a currently played image or video in the second area, displaying a comment content associated with the currently played image or video in the plurality of floating sub-areas of the third area of the search result aggregation card.

8. The method according to claim 1, further comprising:
determining a target entity object associated with the at least one target multimedia content; and
in a fourth area of the search result aggregation card, displaying encyclopedic introductory information of the target entity object, the encyclopedic introductory information being used for displaying an encyclopedic content corresponding to the target entity object after being triggered.

9. An information display apparatus, comprising:
a receiving module, configured to receive search information, the search information corresponding to structured requirements for a search result;
a first acquisition module, configured to acquire at least one target multimedia content matching the search information, the target multimedia content comprising an image content and/or video content;
a first determination module, configured to determine a display mode of the target multimedia content in a search result aggregation card according to an event attribute feature corresponding to the search information, wherein the event attribute feature refers to a structured feature of an event matching the search information, and the event attribute feature comprises a temporal context feature of the event or a structured feature suitable for multi-image or multi-video presentation; and
a first display module, configured to display the search result aggregation card corresponding to the search information according to the display mode determined,
wherein in response to the event corresponding to the search information having the temporal context feature, the first display module is further configured to:
displaying a timeline of the event corresponding to the search information in a first area of the search result aggregation card, a plurality of time nodes being arranged in the timeline, and each time node corresponding to a progressing stage of the event; and
displaying a target multimedia content corresponding to a selected target time node among the plurality of time nodes in a second area of the search result aggregation card.

10. A computer device, comprising a processor, a memory and a bus, wherein the memory stores machine-readable instructions executable by the processor; the processor communicates with the memory through the bus upon the computer device running; and
the machine-readable instructions upon being executed by the processor execute an information display method, and the method comprises:
receiving search information, the search information corresponding to a structured requirement for a search result;
acquiring at least one target multimedia content matching the search information, the target multimedia content comprising an image content and/or a video content;
determining a display mode of the target multimedia content in a search result aggregation card according to an event attribute feature corresponding to the search information, wherein the event attribute feature refers to a structured feature of an event matching the search information, and the event attribute feature comprises a temporal context feature of the event or a structured feature suitable for multi-image or multi-video presentation; and
displaying the search result aggregation card corresponding to the search information according to the display mode determined,
wherein in response to the event corresponding to the search information having the temporal context feature, the displaying the search result aggregation card corresponding to the search information according to the display mode determined comprises:
displaying a timeline of the event corresponding to the search information in a first area of the search result aggregation card, a plurality of time nodes being arranged in the timeline, and each time node corresponding to a progressing stage of the event; and
displaying a target multimedia content corresponding to a selected target time node among the plurality of time nodes in a second area of the search result aggregation card.

11. A computer-readable storage medium, wherein a computer program is stored on the computer-readable storage medium, and upon the computer program being executed by a processor, the information display method according to claim 1 is executed.

12. A computer program product, wherein the computer program product, upon running on a computer, causes the computer to execute the information display method according to claim 1.

13. The computer device according to claim 10, wherein the determining the display mode of the target multimedia content in the search result aggregation card according to the event attribute feature corresponding to the search information comprises:
in response to the event corresponding to the search information having the temporal context feature, determining that the display mode is to display according to the timeline.

14. The computer device according to claim 13, wherein the displaying the target multimedia content corresponding to the selected target time node among the plurality of time nodes in the second area of the search result aggregation card, comprises:
in response to the target time node corresponding to at least one target multimedia content, sequentially displaying the at least one target multimedia content in response to a scroll operation applied to the second area.

15. The computer device according to claim 10, wherein the determining the display mode of the target multimedia content in the search result aggregation card according to the event attribute feature corresponding to the search information comprises:
in response to the search information having the structured feature suitable for multi-image or multi-video presentation, determining that the display mode is multi-picture display; and
the displaying a search result aggregation card corresponding to the search information according to the display mode determined comprises:
displaying dimension information of a plurality of dimensions and a target multimedia content corresponding to each dimension in the first area of the search result aggregation card, the plurality of dimensions being determined based on content attributes of the multi-image or the multi-video; and
displaying a target multimedia content corresponding to a selected target dimension among the plurality of dimensions in the second area of the search result aggregation card,
the target multimedia content corresponding to each dimension displayed in the first area having a same size in a preset direction as the target multimedia content corresponding to the selected target dimension displayed in the second area.

16. The computer device according to claim 15, wherein the displaying dimension information of the plurality of dimensions and the target multimedia content corresponding to each dimension in the first area of the search result aggregation card, comprises:

in the first area, displaying the dimension information of the plurality of dimensions and a target image in each dimension, the target image being used for representing an image set or a video set; and the displaying a target multimedia content corresponding to a selected target dimension among the plurality of dimensions in the second area of the search result aggregation card, comprises:

in the second area, according to an arrangement order of each image or video in the target dimension, sequentially playing each image in the image set or each video in the video set.

17. The computer device according to claim 16, wherein the method further comprises:

in response to determining that there exists a need for displaying a comment content for the event corresponding to the search information, acquiring at least one comment content corresponding to the at least one target multimedia content; and displaying the comment content in a plurality of floating sub-areas of a third area of the search result aggregation card, wherein each of the floating sub-areas is used for displaying one comment content, a number of the floating sub-areas is less than a preset number threshold, and in response to a number of the at least one comment content being greater than the preset number threshold, the floating sub-areas updates the comment content displayed according to a preset frequency.

18. The computer device according to claim 17, wherein the displaying the comment content in a plurality of floating sub-areas of a third area of the search result aggregation card, comprises:

according to a currently played image or video in the second area, displaying a comment content associated with the currently played image or video in the plurality of floating sub-areas of the third area of the search result aggregation card.

19. The computer device according to claim 10, wherein the method further comprises:

determining a target entity object associated with the at least one target multimedia content; and in a fourth area of the search result aggregation card, displaying encyclopedic introductory information of the target entity object, the encyclopedic introductory information being used for displaying an encyclopedic content corresponding to the target entity object after being triggered.

* * * * *